United States Patent
Han et al.

(10) Patent No.: US 12,088,450 B2
(45) Date of Patent: Sep. 10, 2024

(54) COMMUNICATION METHOD AND APPARATUS

(71) Applicant: HUAWEI TECHNOLOGIES CO., LTD., Guangdong (CN)

(72) Inventors: Jing Han, Beijing (CN); Li Zhang, Beijing (CN); Jiantao Xue, Beijing (CN); Jiehua Xiao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 348 days.

(21) Appl. No.: 17/706,316

(22) Filed: Mar. 28, 2022

(65) Prior Publication Data
US 2022/0217034 A1 Jul. 7, 2022

Related U.S. Application Data

(63) Continuation of application No. PCT/CN2019/109240, filed on Sep. 29, 2019.

(51) Int. Cl.
*H04L 27/26* (2006.01)
*H04L 5/00* (2006.01)
*H04W 56/00* (2009.01)

(52) U.S. Cl.
CPC ........ *H04L 27/2655* (2013.01); *H04L 5/0053* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 2019/0261444 A1 | 8/2019 | Axmon et al. | |
| 2020/0196254 A1* | 6/2020 | Kerhuel | H04L 5/0048 |
| 2021/0235513 A1* | 7/2021 | Kim | H04W 74/0816 |

FOREIGN PATENT DOCUMENTS

| | | | |
|---|---|---|---|
| CN | 109091986 A | 12/2018 | |
| CN | 109309955 A | 2/2019 | |
| CN | 109391986 A | 2/2019 | |
| CN | 109565432 A | 4/2019 | |
| EP | 3648497 A1 | 5/2020 | |
| EP | 3713345 B1 * | 9/2022 | H04L 1/1614 |

(Continued)

OTHER PUBLICATIONS

Office Action in Chinese Appln. No. 201980100815.8, dated Apr. 29, 2023, 7 pages.

(Continued)

*Primary Examiner* — Kenny S Lin
(74) *Attorney, Agent, or Firm* — Fish & Richardson P.C.

(57) ABSTRACT

This application relates to the field of communication technologies and discloses a communication method and a communication apparatus. One example method includes: A network device sends temporary SSB burst configuration information to a terminal device served by a secondary serving cell, where the temporary SSB burst configuration information includes a periodicity and/or an offset for sending a temporary SSB burst by the network device in the secondary serving cell configured for the terminal device. The network device sends a temporary SSB burst in the secondary serving cell based on the temporary SSB burst configuration information, where a temporary SSB included in the temporary SSB burst does not include a PBCH.

20 Claims, 9 Drawing Sheets

S201
A network device sends temporary SSB burst configuration information to a terminal device served by a secondary serving cell, and the terminal device receives the temporary SSB burst configuration information sent by the network device S202
The network device sends a temporary SSB burst in the secondary serving cell based on the temporary SSB burst configuration information S203
The terminal device activates the secondary serving cell based on the temporary SSB burst configuration information and based on a regular SSB burst and a temporary SSB burst sent by the network device in the secondary serving cell

(56) References Cited

FOREIGN PATENT DOCUMENTS

| WO | 2019029330 A1 | 2/2019 |
|---|---|---|
| WO | 2019095329 A1 | 5/2019 |

OTHER PUBLICATIONS

3GPP TS 38.133 V15.3.0 (Sep. 2018), "3rd Generation Partnership Project; Technical Specification Group Radio Access Network; NR; Requirements for support of radio resource management(Release 15)," Sep. 2018, 136 pages.
CATT, "CR on NR SCell activation and deactivation delay," 3GPP TSG-RAN4 Meeting #87, R4-1808522, Busan, Korea, May 21-25, 2018, 3 pages.
Huawei, HiSilicon, "Discussion on SCell activation and deactivation," 3GPP TSG RAN WG1 Meeting #97, R1-1906018, Reno, USA, May 13-17, 2019, 11 pages.
MediaTek Inc., "Missing SSB information for target NR cell," 3GPP TSG-RAN WG4 Meeting #AH1807, R4-1808841, Montreal, Canada, Jul. 2-6, 2018, 4 pages.
PCT International Search Report and Written Opinion issued in International Application No. PCT/CN2019/109240 on Jun. 29, 2020, 15 pages (with English translation).
Qualcomm Incorporated, "Fast SCG and SCell Activation," 3GPP TSG-RAN WG1 #97, R1-1907306, Reno, USA, May 13-17, 2019, 11 pages.
RAN WG2, "LS on NR fast SCell activation," 3GPP TSG-RAN2 106, R2-1908483, Reno, USA, May 13-17, 2019, 2 pages.
CATT, "Fast SCell activation and SCell dormancy," 3GPP TSG RAN WG1 Meeting #98, R1-1908578, Prague, CZ, Aug. 26-30, 2019, 3 pages.
Extended European Search Report issued in European Application No. 19946750.7 on Aug. 16, 2022, 9 pages.
Huawei et al., "Initial discussion on fast cell access," 3GPP TSG-RAN WG4 Meeting #92, R4-1909670, Ljubljana, Slovenia, Aug. 26-30, 2019, 5 pages.
Mediatek Inc., "Discussion on NR fast Scell activation," 3GPP TSG-RAN WG4 Meeting #92, R4-1908368, Ljubljana, Slovenia, Aug. 26-30, 2019, 5 pages.

* cited by examiner

COMMUNICATION METHOD AND APPARATUS

CROSS-REFERENCE TO RELATED APPLICATIONS

This application is a continuation of International Application No. PCT/CN2019/109240, filed on Sep. 29, 2019, the disclosure of which is hereby incorporated by reference in its entirety.

TECHNICAL FIELD

This application relates to the field of communication technologies, and in particular, to a communication method and apparatus.

BACKGROUND

To increase a transmission bandwidth and meet a user requirement for increasing a peak rate, an existing terminal device can support simultaneous access to a plurality of cells, to increase the transmission bandwidth, for example, in carrier aggregation (carrier aggregation, CA) and dual-connectivity (dual-connectivity, DC) scenarios of the terminal device. In addition, to decrease an activation delay of a secondary serving cell defined in the Rel-15 standard, a purpose of WI on multi-RAT dual-connectivity and carrier aggregation enhancements (WI multi-RAT dual-connectivity and carrier aggregation enhancements) in the Rel-16 standard is to enable rapid activation of a secondary serving cell, to decrease the activation delay of the secondary serving cell defined in the Rel-15 standard.

Currently, a process of activating a secondary serving cell serving a terminal device includes steps such as activation command processing, cell detection, automatic gain control (automatic gain control, AGC), and fine synchronization. However, cell detection and a part of AGC in the process of activating the secondary serving cell can be implemented only by using a synchronization signal block burst (synchronization signal block burst, SSB burst). An existing network device sends an SSB burst with a large periodicity (which is usually >20 ms) in a cell. As a result, when the terminal device uses the cell as a secondary serving cell, an activation delay of the secondary serving cell is large. Therefore, how to implement rapid activation of a secondary serving cell becomes a problem to be resolved.

SUMMARY

This application provides a communication method and a communication apparatus, which are used to resolve a problem of a large activation delay of a secondary serving cell serving a terminal device in an existing technology.

According to a first aspect, an embodiment of this application provides a communication method. The method includes: A network device sends temporary SSB burst configuration information to a terminal device served by a secondary serving cell, where the temporary SSB burst configuration information includes a periodicity and/or an offset for sending a temporary SSB burst by the network device in the secondary serving cell configured for the terminal device. The network device sends a temporary SSB burst in the secondary serving cell based on the temporary SSB burst configuration information, where a temporary SSB included in the temporary SSB burst does not include a PBCH.

The communication method described in this embodiment of this application and implemented by the network device may alternatively be implemented by a component of the network device, for example, implemented by a processing chip or a circuit in the network device. In the foregoing method, the network device sends the temporary SSB burst configuration information to the terminal device served by the secondary serving cell; and sends, based on the temporary SSB burst configuration information, the temporary SSB burst in the secondary serving cell configured for the terminal device. In this way, the terminal device can activate the secondary serving cell based on a regular SSB burst and the temporary SSB burst sent by the network device in the secondary serving cell configured for the terminal device, thereby decreasing duration of cell detection and AGC in a process of activating an unknown secondary serving cell. In addition, the temporary SSB does not include a PBCH. This can reduce signaling overheads, and avoid a problem that a regular SSB burst-based initial access operation of another terminal device that uses the secondary serving cell as an initial access cell is affected because the another terminal device erroneously determines the temporary SSB burst as a regular SSB burst.

In a possible design, the temporary SSB carries index information of the temporary SSB. In the design, the temporary SSB carries the index information of the temporary SSB. This helps the terminal device accurately determine an index of the temporary SSB and determine timing of the secondary serving cell based on the index of the temporary SSB.

In a possible design, that the temporary SSB carries index information of the temporary SSB includes: The temporary SSB carries 1 bit of information, indicating a remainder of an index mod 2, where the index is carried in the temporary SSB; or the temporary SSB carries 2 bits of information, indicating a remainder of an index mod 4, where the index is carried in the temporary SSB. In the design, the terminal device may determine the index of the temporary SSB based on the index information of the temporary SSB carried in the temporary SSB and timing of a primary serving cell, thereby determining timing of the secondary serving cell.

In a possible design, the index information is carried in the temporary SSB through scrambling by using a sequence of an OCC and/or a sequence of a DMRS. In the design, implementations of carrying the index information in the temporary SSB are extended. The index information of the temporary SSB is carried by using a sequence or a codeword when no PBCH is available for bearing signaling load (a payload). This also facilitates selection, based on required index information (the remainder of the index mod 2 or the remainder of the index mod 4) of the temporary SSB, of a manner for carrying the index information of the temporary SSB.

In a possible design, the temporary SSB burst and a regular SSB burst that is sent by the network device in the secondary serving cell are sent in different half-frames. In the design, the temporary SSB burst and the regular SSB burst sent by the network device in the secondary serving cell are sent in different half-frames. This avoids a conflict in sending the temporary SSB burst and the regular SSB burst, so that activation of the secondary serving cell serving the terminal device and initial access of another terminal device that uses the secondary serving cell as an initial access cell are not affected.

In a possible design, a quantity of temporary SSBs included in a first half-frame for sending the temporary SSB burst is equal to a quantity of regular SSBs included in a second half-frame for sending the regular SSB burst, and a mapped time-domain symbol location of the temporary SSB burst in the first half-frame is the same as a mapped time-domain symbol location of the regular SSB burst in the second half-frame. In the design, the temporary SSB burst and the regular SSB burst sent by the network device are the same in terms of the quantities of SSBs and the mapped time-domain symbol locations in the half-frames and the like. This ensures consistency between the temporary SSB burst and the regular SSB burst sent by the network device, so that the terminal device uses a detection method same as or similar to that for detecting the regular SSB burst to detect the temporary SSB burst, thereby activating the secondary serving cell.

In a possible design, before the network device sends the temporary SSB burst configuration information to the terminal device served by the secondary serving cell, the method further includes: The network device determines, based on received capability information sent by the terminal device, that the terminal device supports secondary serving cell detection based on a temporary SSB burst, where the capability information indicates whether the terminal device supports secondary serving cell detection based on a temporary SSB burst. In the design, the network device is enabled to identify, based on the capability information indicating whether the terminal device supports secondary serving cell detection based on a temporary SSB burst, a secondary serving cell activation manner supported by the terminal device. This avoids a waste of resources caused by sending a temporary SSB burst in the secondary serving cell when the terminal device does not support secondary serving cell activation through cell detection based on a regular SSB burst and a temporary SSB burst.

In a possible design, after receiving a message that is sent by the terminal device and that indicates that the secondary serving cell detection is completed, the network device stops sending a temporary SSB burst in the secondary serving cell; or the network device stops sending a temporary SSB burst in the secondary serving cell when duration of sending temporary SSB bursts in the secondary serving cell exceeds a duration threshold. In the design, after receiving the message that is sent by the terminal device and that indicates that the secondary serving cell detection is completed or after sending temporary SSB bursts in the secondary serving cell for duration exceeding the duration threshold, the network device stops sending a temporary SSB burst in the secondary serving cell. This is conducive to saving resources of the network device.

According to a second aspect, an embodiment of this application provides a communication method. The method includes: A terminal device receives temporary SSB burst configuration information sent by a network device, where the temporary SSB burst configuration information includes a periodicity and/or an offset for sending a temporary SSB burst by the network device in a secondary serving cell configured for the terminal device. The terminal device activates the secondary serving cell based on the temporary SSB burst configuration information and based on a regular SSB burst and a temporary SSB burst sent by the network device in the secondary serving cell, where a temporary SSB included in the temporary SSB burst does not include a PBCH.

The communication method described in this embodiment of this application and implemented by the terminal device may alternatively be implemented by a component of the terminal device, for example, implemented by a processing chip or a circuit in the terminal device. In the foregoing method, the network device sends the temporary SSB burst configuration information to the terminal device served by the secondary serving cell; and sends, based on the temporary SSB burst configuration information, the temporary SSB burst in the secondary serving cell configured for the terminal device. In this way, the terminal device can activate the secondary serving cell based on the regular SSB burst and the temporary SSB burst sent by the network device in the secondary serving cell configured for the terminal device, thereby decreasing duration of cell detection and AGC in a process of activating an unknown secondary serving cell. In addition, the temporary SSB does not include a PBCH. This can reduce signaling overheads, and avoid a problem that a regular SSB burst-based initial access operation of another terminal device that uses the secondary serving cell as an initial access cell is affected because the another terminal device erroneously determines the temporary SSB burst as a regular SSB burst.

In a possible design, a cell detection duration threshold in a process of activating the secondary serving cell by the terminal device is determined based on a union set of the regular SSB burst and the temporary SSB burst. The design is conducive to ensuring that the terminal device determines, based on the union set of the regular SSB burst and the temporary SSB burst sent by the network device in the secondary serving cell, the cell detection duration threshold in the process of activating the secondary serving cell; and performs cell detection, thereby decreasing an activation delay of the secondary serving cell.

In a possible design, the temporary SSB carries index information of the temporary SSB. In the design, the temporary SSB carries the index information of the temporary SSB. This helps the terminal device accurately determine an index of the temporary SSB and determine timing of the secondary serving cell based on the index of the temporary SSB.

In a possible design, that the temporary SSB carries index information of the temporary SSB includes: The temporary SSB carries 1 bit of information, indicating a remainder of an index mod 2, where the index is carried in the temporary SSB; or the temporary SSB carries 2 bits of information, indicating a remainder of an index mod 4, where the index is carried in the temporary SSB. In the design, the terminal device may determine the index of the temporary SSB based on the index information of the temporary SSB carried in the temporary SSB and timing of a primary serving cell, thereby determining timing of the secondary serving cell.

In a possible design, the index information is carried in the temporary SSB through scrambling by using a sequence of an OCC and/or a sequence of a DMRS. In the design, implementations of carrying the index information in the temporary SSB are extended. The index information of the temporary SSB is carried by using a sequence or a codeword when no PBCH is available for bearing signaling load (a payload). This also facilitates selection, based on required index information (the remainder of the index mod 2 or the remainder of the index mod 4) of the temporary SSB, of a manner for carrying the index information of the temporary SSB.

In a possible design, the temporary SSB burst and the regular SSB burst that is sent by the network device in the secondary serving cell are sent in different half-frames. In the design, the temporary SSB burst and the regular SSB burst sent by the network device in the secondary serving cell are sent in different half-frames. This avoids a conflict in sending the temporary SSB burst and the regular SSB burst, so that activation of the secondary serving cell serving the terminal device and initial access of another terminal device that uses the secondary serving cell as an initial access cell are not affected.

In a possible design, a quantity of temporary SSBs included in a first half-frame for sending the temporary SSB burst is equal to a quantity of regular SSBs included in a second half-frame for sending the regular SSB burst, and a mapped time-domain symbol location of the temporary SSB burst in the first half-frame is the same as a mapped time-domain symbol location of the regular SSB burst in the second half-frame. In the design, the temporary SSB burst and the regular SSB burst sent by the network device are the same in terms of the quantities of SSBs and the mapped time-domain symbol locations in the half-frames and the like. This ensures consistency between the temporary SSB burst and the regular SSB burst sent by the network device, so that the terminal device uses a detection method same as or similar to that for detecting the regular SSB burst to detect the temporary SSB burst, thereby activating the secondary serving cell.

In a possible design, before the terminal device receives the temporary SSB burst configuration information sent by the network device, the method further includes: The terminal device sends capability information to the network device, where the capability information indicates whether the terminal device supports secondary serving cell detection based on a temporary SSB burst. In the design, the network device is enabled to identify, based on the capability information indicating whether the terminal device supports secondary serving cell detection based on a temporary SSB burst, a secondary serving cell activation manner supported by the terminal device. This avoids a waste of resources caused by sending a temporary SSB burst in the secondary serving cell when the terminal device does not support secondary serving cell activation through cell detection based on a regular SSB burst and a temporary SSB burst.

In a possible design, the method further includes: After completing the secondary serving cell detection, the terminal device sends, to the network device, a message indicating that the secondary serving cell detection is completed. In the design, after completing the secondary serving cell detection, the terminal device sends, to the network device, the message indicating that the secondary serving cell detection is completed, so that the network device stops sending a temporary SSB burst in the secondary serving cell after receiving the message that is sent by the terminal device and that indicates that the secondary serving cell detection is completed. This is conducive to saving resources of the network device.

According to a third aspect, an embodiment of this application provides a communication apparatus. The apparatus has a function of implementing the method according to any one of the first aspect or the possible designs of the first aspect. The function may be implemented by hardware, or may be implemented by hardware by executing corresponding software. The hardware or the software includes one or more modules corresponding to the function, for example, a transceiver unit and a processing unit.

In a possible design, the apparatus may be a chip or an integrated circuit.

In a possible design, the apparatus includes a memory and a processor. The memory is configured to store a program executed by the processor. When the program is executed by the processor, the apparatus may perform functions in the method according to any one of the first aspect or the possible designs of the first aspect.

In a possible design, the apparatus may be a network device.

According to a fourth aspect, an embodiment of this application provides a communication apparatus. The apparatus has a function of implementing the method according to any one of the second aspect or the possible designs of the second aspect. The function may be implemented by hardware, or may be implemented by hardware by executing corresponding software. The hardware or the software includes one or more modules corresponding to the function, for example, a transceiver unit and a processing unit.

In a possible design, the apparatus may be a chip or an integrated circuit.

In a possible design, the apparatus includes a memory and a processor. The memory is configured to store a program executed by the processor. When the program is executed by the processor, the apparatus may perform functions in the method according to any one of the second aspect or the possible designs of the second aspect.

In a possible design, the apparatus may be a terminal device.

According to a fifth aspect, an embodiment of this application provides a communication system. The communication system may include a terminal device and a network device. The terminal device may be configured to perform the method according to any one of the second aspect or the possible designs of the second aspect, and the network device may be configured to perform the method according to any one of the first aspect or the possible designs of the first aspect.

According to a sixth aspect, an embodiment of this application provides a computer-readable storage medium. The storage medium stores computer instructions. When the computer instructions are executed, the method according to any one of the first aspect or the possible designs of the first aspect may be implemented, or the method according to any one of the second aspect or the possible designs of the second aspect may be implemented.

According to a seventh aspect, an embodiment of this application further provides a computer program product, including a computer program or instructions. When the computer program or the instructions are executed, the method according to any one of the first aspect or the possible designs of the first aspect may be implemented, or the method according to any one of the second aspect or the possible designs of the second aspect may be implemented.

According to an eighth aspect, an embodiment of this application further provides a chip. The chip is coupled to a memory, and is configured to read and execute program instructions stored in the memory, to implement the method according to any one of the first aspect or the possible designs of the first aspect, or implement the method according to any one of the second aspect or the possible designs of the second aspect.

DESCRIPTION OF EMBODIMENTS

The following describes in detail the embodiments of this application with reference to the accompanying drawings.

Figure 1:
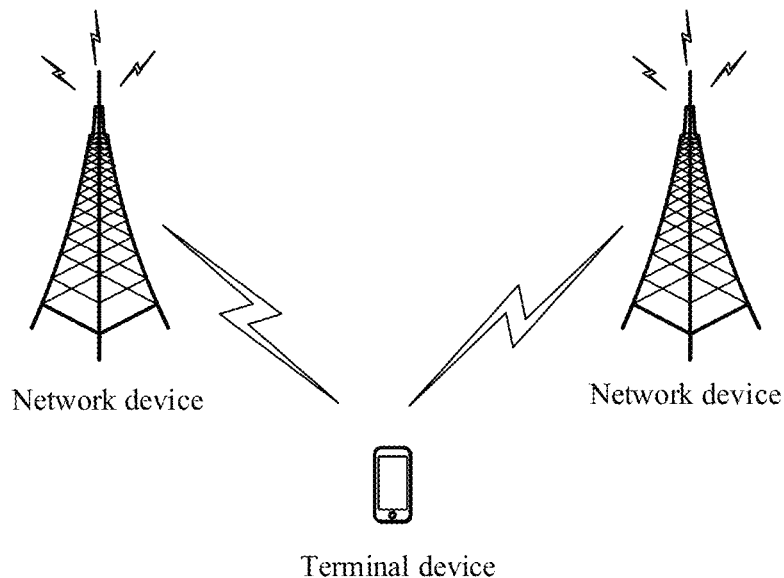
FIG. 1 is a schematic diagram of a communication architecture according to an embodiment of this application.

Technical solutions of the embodiments of this application may be applied to various communication systems, for example, communication systems such as a fifth generation (5th generation, 5G) communication system and a long term evolution-advanced (long term evolution-advanced, LTE-A) system; and may also be extended to related cellular systems such as wireless fidelity (wireless fidelity, Wi-Fi) and worldwide interoperability for microwave access (worldwide interoperability for microwave access, wimax), and to a future communication system, for example, a 6G system. The technical solutions may be applied to a CA scenario, and may also be applied to a DC scenario or the like. An architecture of a communication system to which the embodiments of this application are applied may be shown in FIG. 1, and includes at least one network device and a terminal device. In FIG. 1, two network devices are used as an example. Each network device may have one or more cells. The terminal device may access a plurality of cells of the same network device, or may access a plurality of cells of different network devices. In other words, a network device may configure one primary serving cell (pcell) and at least one secondary serving cell (scell) for the terminal device.

Before the embodiments of this application are described, some terms in this application are first described, to help a person skilled in the art have a better understanding.

(1) A terminal device is a device that provides a user with voice and/or data connectivity, for example, may be a handheld device with a wireless connection function, or a processing device connected to a wireless modem. The terminal device may communicate with a core network through a radio access network (radio access network, RAN), and exchange voice and/or data with the RAN. The terminal device may include user equipment (user equipment, UE), a wireless terminal device, a mobile terminal device, a device-to-device (device-to-device, D2D) communication terminal device, a V2X terminal device, a machine-to-machine/machine-type communication (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device further includes a limited device, for example, a device with low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner.

By way of example and not limitation, the terminal device in the embodiments of this application may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn by a user or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that focus only on one type of application function and need to collaboratively work with other devices such as smartphones, for example, various smart bands, smart helmets, or smart jewelry for monitoring physical signs.

In addition, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on board units (on-board unit, OBU).

In the embodiments of this application, the terminal device may further include a relay (relay). Alternatively, it may be understood as that any device that can perform data communication with a base station may be considered as the terminal device.

(2) A network device may be a device that is in an access network and that communicates with a wireless terminal device over an air interface through one or more cells. The network device may be a node in a radio access network, and may also be referred to as a base station, or may be referred to as a radio access network (radio access network, RAN) node (or device). Currently, for example, some network devices are a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a base band unit (base band unit, BBU), or a wireless fidelity (wireless fidelity, Wi-Fi) access point (access point, AP). In addition, in a network structure, the network device may include a centralized unit (centralized unit, CU) node and a distributed unit (distributed unit, DU) node. The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer.

(3) A process of activating a secondary serving cell in the Rel-15 standard: In the Rel-15 standard, the process of activating a secondary serving cell includes two cases: The secondary serving cell is known and the secondary serving cell is unknown. The secondary serving cell is "known" when the following condition is met: A terminal device has reported (that is, sent to a network device) a reference signal received power (reference signal receiving power, RSRP) of the secondary serving cell within preset duration before activating the secondary serving cell. In addition, for a secondary serving cell in FR2 (24250 MHz to 52600 MHz), it is additionally required that transmission control information (transmission control information, TCI) in a process of activating the secondary serving cell is determined based on an SSB or a CSI-RS index reported by the terminal device. In the Rel-15 standard, the process of activating a secondary serving cell mainly includes the following steps:

Step A: Process an activation command. For example, a terminal device activates, based on an activation command sent by a network device, a radio frequency corresponding to the secondary serving cell.

Step B: Perform cell detection. For example, the terminal device detects or measures the secondary serving cell. (This step is required when the secondary serving cell is unknown.)

Step C: Perform AGC. For example, the terminal device automatically controls a gain of an amplification circuit based on a signal strength of the secondary serving cell. (This step is required when the secondary serving cell is unknown, or when the secondary serving cell is in FR1 (450 MHz to 6000 MHz) and is known but an RSRP measurement cycle is greater than 160 ms.)

Step D: Measure and report a layer 1 reference signal received power (layer one-reference signal receiving power, L1-RSRP). For example, the terminal device measures an L1-RSRP of the secondary serving cell and reports a measurement result to the network device. (This step is required when the secondary serving cell is a first secondary serving cell in FR2 and the first secondary serving cell in FR2 is unknown.)

Step E: Wait for the network device to send a TCI activation command. For example, the terminal device determines, based on the TCI activation command sent by the network device, a beam for sending uplink data (from the terminal device to the network device) and a beam for receiving downlink data (from the network device to the terminal device). (This step is required when the secondary serving cell is a first secondary serving cell in FR2.)

Step F: Perform fine synchronization. For example, the terminal device performs timing synchronization on a primary serving cell and the secondary serving cell. (This step is required except when the secondary serving cell is a secondary serving cell in FR2 and has no SSB burst.)

Step G: Measure, process, and report channel state information (channel state information, CSI). For example, the terminal device reports a CSI measurement result of the secondary serving cell and activates the secondary serving cell.

In a requirement in the Rel-15 standard, step B, step C, and step F are defined based on an SSB burst or SSB measurement timing configuration (SSB measurement timing configuration, SMTC) periodicity. Step D depends on a network configuration and may be based on an SSB burst or channel state indication-reference signal (channel state information reference signal, CSI-RS) periodicity. Step G depends on the network configuration and may be based on the CSI-RS periodicity.

For activation delays in various cases based on an activation requirement of a secondary serving cell in Rel-15, refer to Table 1:

TABLE 1

| Case with the secondary serving cell | Best estimate of activation delay (best estimate of activation delay) |
|---|---|
| In FR1, known known, and measurement cycle (meas cycle) = 160 ms | PSSB + 5 |
| In FR1, known, and meas cycle > 160 ms | 2 × PSSB + 5 |
| In FR1 and unknown (unknown) | 4 × PSSB + 5 |
| First secondary serving cell in FR2 and known (first scell known) | PSSB + 5 |
| First secondary serving cell in FR2 and unknown (first scell unknown) | 25 × PSSB + 5 + TL1-RSRP |
| Non-first secondary serving cell in FR2, with an SSB (FR2 non-first Scell with SSB) | PSSB + 5 |
| Non-first secondary serving cell in FR2, without an SSB (FR2 non-first Scell without SSB) | 3 (strong assumption on NW side) |

The best estimates of the activation delays are in the unit of ms, excluding duration of a hybrid automatic repeat request and channel state information reporting duration (excluding $T_{HARQ}$ and $T_{CSI\_Reporting}$). The best estimates of the activation delays are obtained by assuming that no extra delay is generated when a network device in FR2 sends a TCI activation command. $P_{SSB}$ represents a periodicity for sending an SSB burst in the secondary serving cell by the network device, and $T_{L1\text{-}RSRP}$ represents duration for measuring $L_{1\text{-}RSRP}$ of the secondary serving cell by a terminal device.

It can be learned from the foregoing process of activating a secondary serving cell in the Rel-15 standard that cell detection and a part of AGC can be completed only by using an SSB burst. To decrease an activation delay of an unknown secondary serving cell, this application intends to add sending of a temporary SSB burst in a process of activating a secondary serving cell, thereby decreasing an activation delay of the secondary serving cell; and also intends to avoid a problem that a regular SSB burst-based operation of a terminal device that performs normal initial access to the secondary serving cell is affected because the terminal device that performs initial access to the cell erroneously determines the temporary SSB burst as a regular SSB burst sent by a network device in the secondary serving cell.

The following describes in detail the embodiments of this application with reference to the accompanying drawings. In addition, it should be understood that the term "for example" in the embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

The terms "include/comprise" and "have" in the embodiments, claims, and accompanying drawings of this application are not exclusive. For example, a process, a method, a system, a product, or a device including a series of steps or modules is not limited to the listed steps or modules, and may further include steps or modules that are not listed. The terms "system" and "network" may be used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects. It should be understood that in the embodiments of this application, "B corresponding to A" indicates that B is associated with A, and B may be determined according to A. However, it should further be understood that determining B according to A does not mean that B is determined according to A only; that is, B may also be determined according to A and/or other information. In addition, unless otherwise stated, ordinal numbers such as "first" and "second" in the embodiments of this application are used to distinguish between a plurality of objects, but are not intended to limit a sequence, a time sequence, priorities, or importance of the plurality of objects. Moreover, the terms "include/comprise" and "have" in the embodiments, claims, and accompanying drawings of this application are not exclusive. For example, a process, method, system, product, or device including a series of steps or modules is not limited to the listed steps or modules, and may further include steps or modules that are not listed. "A plurality of" in this application means two or more.

In addition, in the embodiments of this application, information (information), a signal (signal), a message (message), and a channel (channel) may be interchangeably used sometimes. It should be noted that meanings expressed by the terms are consistent when differences are not emphasized. "Of (of)", "corresponding, relevant (corresponding, relevant)", and "corresponding (corresponding)" may be interchangeably used sometimes. It should be noted that, meanings expressed by the terms are consistent when differences between the terms are not emphasized.

Embodiment 1

Figure 2:
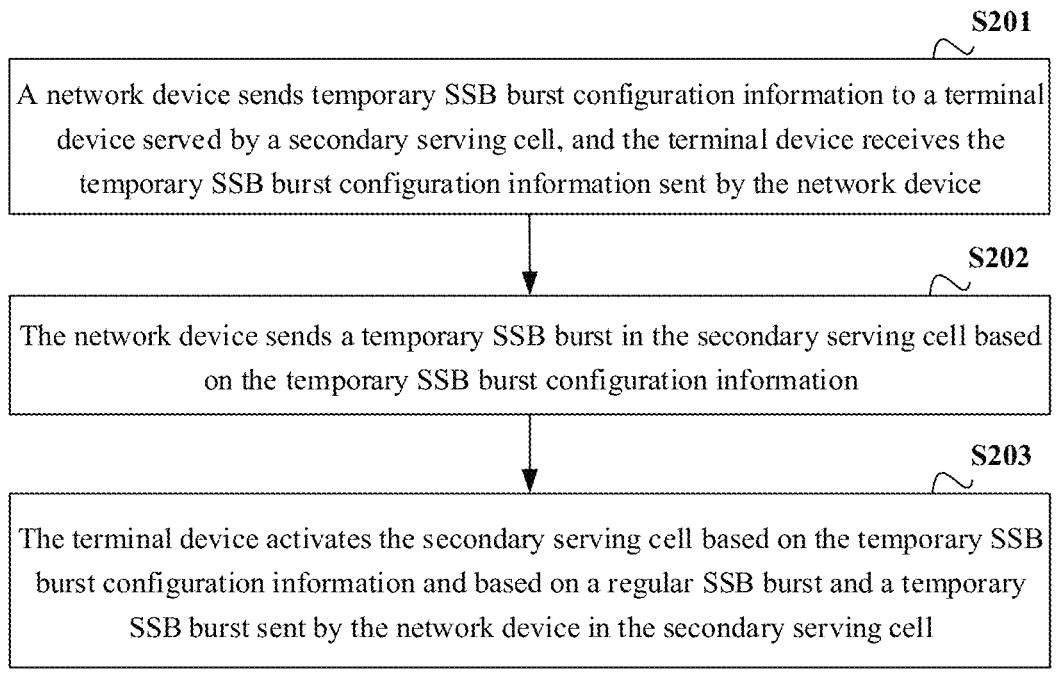
FIG. 2 is a schematic diagram of a communication process according to an embodiment of this application.

FIG. 2 is a schematic diagram of a communication process according to an embodiment of this application. The process includes the following steps.

S201. A network device sends temporary SSB burst configuration information to a terminal device of a secondary serving cell, and the terminal device receives the temporary SSB burst configuration information sent by the network device.

The temporary SSB burst configuration information includes a periodicity and/or an offset (offset) for sending a temporary SSB burst by the network device in the secondary serving cell configured for the terminal device.

Figure 3:
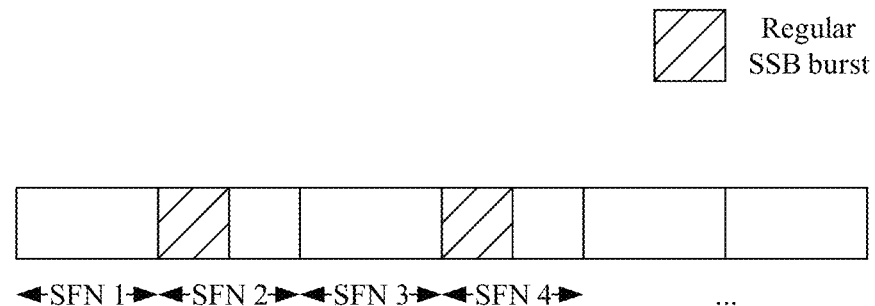
FIG. 3 is a schematic diagram of distribution of a regular SSB burst according to an embodiment of this application.

To ensure that the terminal device can normally perform initial random access, regardless of whether the network device configures a cell serving the network device as a secondary serving cell serving a terminal device, the network device broadcasts a periodicity for sending a regular SSB burst in the cell, and sends a regular SSB burst in the cell based on the periodicity for sending a regular SSB burst in the cell. For example, as shown in FIG. 3, an SFN is a system frame number. Regular SSB bursts are sent (transmitted) in a cell in frames 1, 3, and 5 with a periodicity of 20 ms (which is a length of two frames). An offset of a regular SSB burst is 10 ms (which is a length of one frame).

In this embodiment of this application, to implement rapid activation of a secondary serving cell, when the network device configures a cell serving the network device as a secondary serving cell serving the terminal device and indicates the terminal device to activate the secondary serving cell, the network device additionally sends a temporary SSB burst in the cell on a basis of sending a regular SSB burst, to increase a speed of the terminal device in activating the secondary serving cell and decrease a delay in activating the secondary serving cell by the terminal device. Specifically, before sending the temporary SSB burst, the network device sends the temporary SSB burst configuration information to the terminal device. The information may be configured in a form of a temporary SSB measurement timing configuration (SSB measurement timing configuration, SMTC).

Optionally, the network device may determine, based on a periodicity for sending a regular SSB burst in the secondary serving cell configured for the terminal device and the periodicity and the offset for sending a temporary SSB burst in the secondary serving cell configured for the terminal device, information content included in the temporary SSB burst configuration information sent to the terminal device.

In a possible implementation, if the periodicity for sending a temporary SSB burst and the periodicity for sending a regular SSB burst by the network device in the secondary serving cell configured for the terminal device are the same, the temporary SSB burst configuration information sent by the network device to the terminal device may include only the offset of a temporary SSB burst. When the temporary SSB burst configuration information sent by the network device includes only the offset of a temporary SSB burst, the terminal device determines that the periodicity for sending a temporary SSB burst by the network device in the secondary serving cell configured for the terminal device and the periodicity for sending a regular SSB burst by the network device in the secondary serving cell configured for the terminal device are the same. A regular SSB burst and a temporary SSB burst in an SSB burst periodicity (the periodicity for sending a temporary SSB burst/the periodicity for sending a regular SSB burst) are distinguished based on the offset of a temporary SSB burst.

In another possible implementation, if the periodicity for sending a temporary SSB burst by the network device in the secondary serving cell configured for the terminal device and the periodicity for sending a regular SSB burst by the network device in the secondary serving cell configured for the terminal device are different, the temporary SSB burst configuration information sent by the network device to the terminal device may include only the periodicity for sending a temporary SSB burst, or may include both the periodicity and the offset for sending a temporary SSB burst. The terminal device may identify, based on the periodicity for sending a regular SSB burst, a regular SSB burst sent by the network device in the secondary serving cell configured for the terminal device; and identify, based on the periodicity for sending a temporary SSB burst or based on the periodicity and the offset for sending a temporary SSB burst, a temporary SSB burst sent by the network device in the secondary serving cell configured for the terminal device.

For example, the temporary SSB burst configuration information may be sent by using a dedicated (dedicated) radio resource control (radio resource control, RRC) message of the terminal device or another RRC configuration message.

S202: The network device sends a temporary SSB burst in the secondary serving cell based on the temporary SSB burst configuration information.

In a possible implementation, to prevent the temporary SSB burst from affecting sending of a regular SSB burst, the temporary SSB burst sent by the network device in the secondary serving cell configured for the terminal device and a regular SSB burst sent in the secondary serving cell are sent in different half-frames.

Optionally, when the periodicities for sending a temporary SSB burst and a regular SSB burst by the network device in the secondary serving cell configured for the terminal device are the same, the offset for sending a temporary SSB burst is different from an offset for sending a regular SSB burst, and an absolute value of a difference between the offset for sending a temporary SSB burst and the offset for sending a regular SSB burst is not less than a half-frame (5 ms), to ensure that the temporary SSB burst and the regular SSB burst are sent in different half-frames. When the periodicities for sending a temporary SSB burst and a regular SSB burst by the network device in the secondary serving cell configured for the terminal device are different, if the temporary SSB burst and the regular SSB burst need to be sent in a same half-frame, the network device sends only the regular SSB burst, to ensure that the temporary SSB burst and the regular SSB burst are sent in different half-frames.

Figure 4:
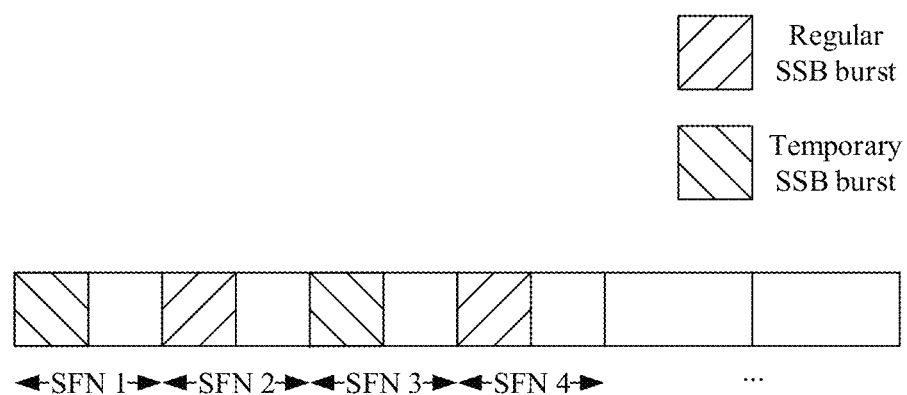
FIG. 4 is a schematic diagram of distribution of a regular SSB burst and a temporary SSB burst according to an embodiment of this application.

For example, the periodicities for sending a temporary SSB burst and a regular SSB burst by the network device in the secondary serving cell configured for the terminal device are the same, as shown in FIG. 4. In the secondary serving cell configured for the terminal device, the network device sends a regular SSB burst with a periodicity of 20 ms and an offset of 10 ms of a regular SSB burst, and sends a temporary SSB burst with a periodicity of 20 ms and an offset of 0 ms of a temporary SSB burst. The regular SSB burst is in half-frames of frames 1, 3, 5, . . . of the secondary serving cell configured for the terminal device, and the temporary SSB burst is in half-frames of frames 0, 2, 4, . . . of the secondary serving cell configured for the terminal device.

Figure 5:
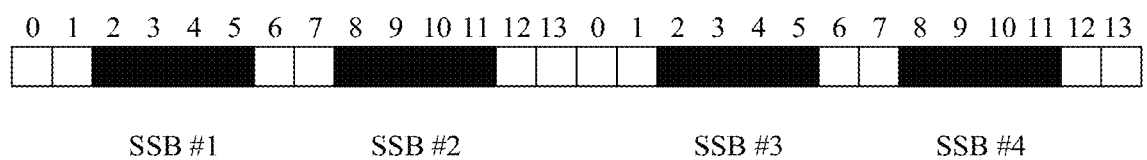
FIG. 5 is a schematic diagram of distribution of SSBs included in an SSB burst according to an embodiment of this application.

In this embodiment of this application, an SSB burst includes one or more SSBs. For example, as shown in FIG. 5, an SSB burst (a regular SSB burst or a temporary SSB burst) sent by the network device in the secondary serving cell includes four SSBs in a half-frame. Optionally, to ensure configuration consistency between the temporary SSB burst and the regular SSB burst to facilitate identification by the terminal device, so as activate the secondary serving cell, a quantity of temporary SSBs included in a first half-frame for sending the temporary SSB burst by the network device is equal to a quantity of regular SSBs included in a second half-frame for sending the regular SSB burst, and a mapped time-domain symbol location of the temporary SSB burst in the first half-frame is the same as a mapped time-domain symbol location of the regular SSB burst in the second half-frame.

In addition, it should be understood that, in this embodiment of this application, to prevent erroneously determining of the temporary SSB burst as a regular SSB burst, temporary SSBs included in the temporary SSB burst sent by the network device in the secondary serving cell configured for the terminal device and regular SSBs included in the regular SSB burst sent by the network device in the secondary serving cell are different SSBs. This prevents a problem that a regular SSB burst-based operation is affected because another terminal device that uses the secondary serving cell as an initial access cell erroneously determines the temporary SSB burst as a regular SSB burst.

In a possible implementation, a temporary SSB included the temporary SSB burst sent by the network device in the secondary serving cell configured for the terminal device does not carry information about a frame number (SFN). For example, the temporary SSB included the temporary SSB burst does not include a physical broadcast channel (physical broadcast channel, PBCH). In this way, the terminal device cannot obtain a PBCH from the temporary SSB and cannot obtain, through parsing, information that is carried in a PBCH and that is about a frame number of a frame for sending the temporary SSB. In other words, the terminal device cannot obtain, based on the temporary SSB included the temporary SSB burst, information about a frame number of a frame for sending the temporary SSB burst. The terminal device determines an offset of an SSB based on a number that is of a frame in which the SSB is located and that is identified in a cell detection process. Therefore, after detecting the temporary SSB, the terminal device does not determine an offset of a regular SSB based on the detected temporary SSB.

Figure 6:
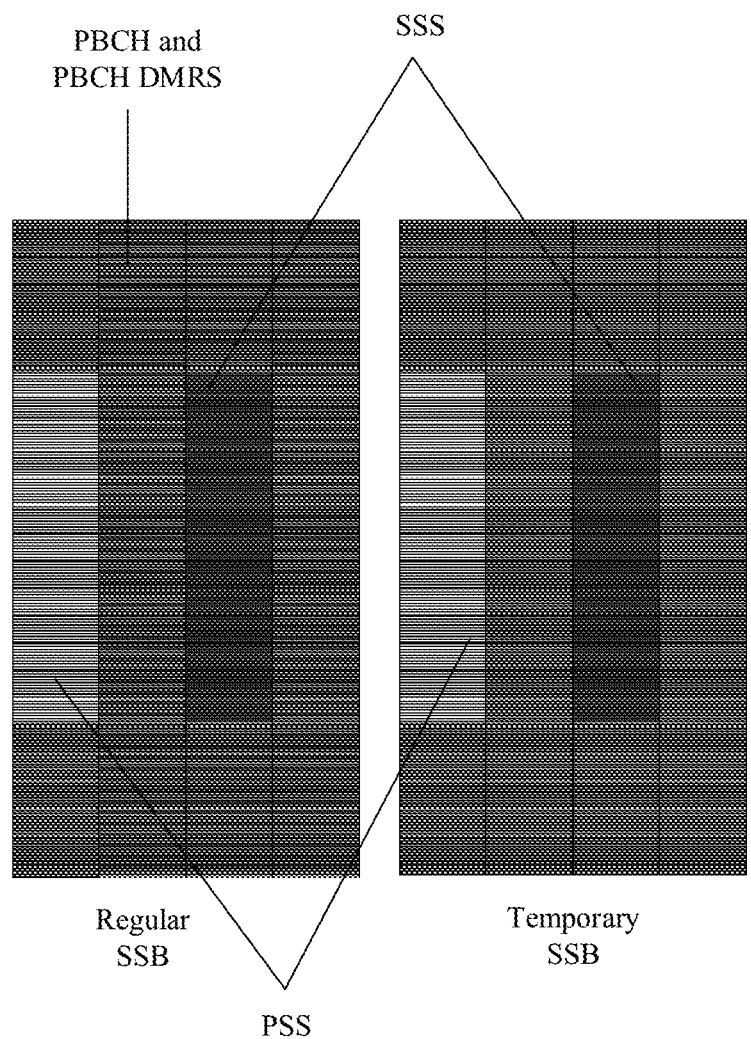
FIG. 6 is a schematic diagram of composition of a regular SSB and a temporary SSB according to an embodiment of this application.

The terminal device may determine, based on whether frame number information of a frame for sending an SSB burst can be obtained, whether the SSB burst is a regular SSB burst or a temporary SSB burst. For example, a temporary SSB may not include a PBCH or a demodulation reference signal (demodulation reference signal, DMRS) of a PBCH. FIG. 6 is a diagram of a comparison between a regular SSB and a temporary SSB. The picture on the left is a regular SSB, and the picture on the right is a temporary SSB. Compared with the regular SSB, the temporary SSB includes only a primary synchronization signal (primary synchronization signal, PSS) and a secondary synchronization signal (secondary synchronization signal, SSS).

In another possible embodiment, a temporary SSB identifier may be further added to a temporary SSB compared to a regular SSB, to distinguish between the regular SSB and the temporary SSB, thereby distinguishing between a temporary SSB burst including the temporary SSB and a regular SSB burst including the regular SSB.

In addition, to reduce signaling overheads and avoid a waste of processing resources of the network device, before the network device sends the temporary SSB burst configuration information to the terminal device served by the secondary serving cell, the terminal device sends capability information to the network device. The capability information indicates whether the terminal device supports secondary serving cell detection based on a temporary SSB burst. Based on the received capability information sent by the terminal device, the network device sends the temporary SSB burst configuration information to the terminal device served by the secondary serving cell and sends a temporary SSB burst in the secondary serving cell only when determining that the terminal device supports secondary serving cell detection based on a temporary SSB burst, to reduce signaling overheads and save processing resources of the network device.

S203: The terminal device activates the secondary serving cell based on the temporary SSB burst configuration information and based on the regular SSB burst and the temporary SSB burst sent by the network device in the secondary serving cell.

Still in the example in which in the secondary serving cell configured for the terminal device, the network device sends a regular SSB burst with a periodicity of 20 ms and an offset of 10 ms of a regular SSB burst, and sends a temporary SSB burst with a periodicity of 20 ms and an offset of 0 ms of a temporary SSB burst, as shown in FIG. 4, the terminal device determines, based on the periodicity 20 ms that is used for sending a regular SSB burst and that is broadcast by the network device and the offset 10 ms that is used for sending a temporary SSB burst and that is included in the sent temporary SSB burst configuration information, that the regular SSB burst is half-frames of frames 1, 3, 5, . . . of the secondary serving cell configured for the terminal device and that the temporary SSB burst is in half-frames of frames 0, 2, 4, . . . of the secondary serving cell configured for the terminal device.

The terminal device completes, based on a union set of the temporary SSB burst and the regular SSB burst, cell detection and AGC in a process of activating an unknown secondary serving cell. Still using FIG. 4 as an example, the periodicity and the offset for sending a regular SSB burst are respectively 20 ms and 10 ms, and the periodicity and the offset for sending a temporary SSB burst are respectively 20 ms and 0 ms. The union set of the temporary SSB burst and the regular SSB burst is an SSB burst whose periodicity is 10 ms. The terminal device completes, based on the SSB burst whose periodicity is 10 ms, the cell detection and AGC in the process of activating an unknown secondary serving cell. As shown in Table 1, for example, the secondary serving cell configured for the terminal device is an unknown secondary serving cell in FR1. In this embodiment of this application, an activation delay of the secondary serving cell is decreased to 45 ms, while when only a regular SSB burst is sent with a periodicity of 20 ms, an activation delay is 4×PSSB+5=85 ms.

Figure 7:
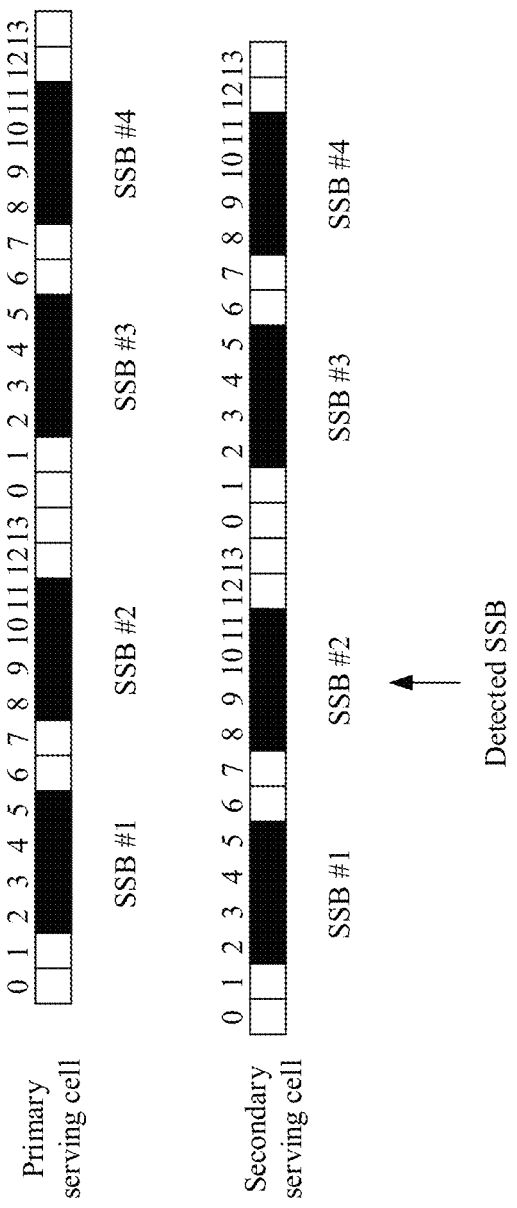
FIG. 7 is a schematic diagram of distribution of SSBs in a primary serving cell and a secondary serving cell according to an embodiment of this application.

In addition, during cell detection in the secondary serving cell (secondary serving cell detection), the terminal device needs to determine an index of a detected SSB, to obtain timing of the secondary serving cell. A temporary SSB does not include a PBCH. Therefore, an index of the temporary SSB cannot be obtained based on a PBCH. In CA or another scenario, the terminal device may determine, based on the temporary SSB burst configuration information and the periodicity for sending a regular SSB burst, whether a regular SSB or a temporary SSB is detected. If a temporary SSB is detected, because a frame boundary location of a primary serving cell is known, a frame boundary location of the secondary serving cell may be determined based on a boundary location of a frame the primary serving cell, and an index of the temporary SSB may be determined based on a time-domain location of the detected temporary SSB and the frame boundary location, thereby obtaining timing of the secondary serving cell. As shown in FIG. 7, when a temporary SSB is detected, a boundary location of a frame of the primary serving cell may be used as a boundary location of a frame of the secondary serving cell, and an order of a detected temporary SSB in the frame is identified, thereby determining an index of the temporary SSB. If the second temporary SSB in the frame is detected, it is determined that an index of the temporary SSB is 2.

However, receiving timing of the terminal device may vary in the primary serving cell and the secondary serving cell (as shown in FIG. 7, locations of OFDM symbols with a same number are not aligned in time domain). Therefore, when an index of an SSB detected in the secondary serving cell is determined based on a frame boundary of the primary serving cell, a timing error between the primary serving cell and the secondary serving cell cannot exceed two OFDM symbols (because each SSB in an SSB burst includes four OFDM symbols in time domain). However, a maximum receiving timing error allowed in an existing protocol can be three OFDM symbols (FR1-FR2 CA, SSB SCS=120 kHz) or six OFDM symbols (FR1-FR2 CA, SSB SCS=240 kHz). Therefore, a temporary SSB design in the secondary serving cell needs to enable the terminal device to distinguish an ambiguity of two (120 kHz) or four (240 kHz) consecutive SSBs.

Optionally, to enable to the terminal device to obtain the timing of the secondary serving cell, the temporary SSB carries index information of the temporary SSB. It should be understood that the index information of the temporary SSB carried in the temporary SSB is an index of a half-frame for sending the temporary SSB burst.

In a possible implementation, to enable the terminal device to distinguish ambiguity of two consecutive SSBs, the temporary SSB carries 1 bit of information, indicating a remainder of an index mod 2, where the index is carried in the temporary SSB. When the remainder of the index mod 2 is 0, it indicates that the index is an even number. When the remainder of the index mod 2 is 1, it indicates that the index is an odd number Optionally, the index information is carried in the temporary SSB through scrambling by using a sequence of an orthogonal cover code (orthogonal cover code, OCC) and/or a sequence of a DMRS. For example, PSS and SSS sequences of the temporary SSB are multiplied by an OCC whose length is 2. For an SSB whose index is an odd number, a codeword of the OCC is [1 1]. For an SSB whose index is an even number, a codeword of the OCC is [1 −1]. For another example, in a symbol (OFDM symbol) of a PSS and an SSS included in a temporary SSB, an extra reference signal, for example, a PBCH DMRS, is sent on a subcarrier different from that occupied by the PSS and the SSS. An i_SSB parameter in scrambling initialization of the sequence represents whether an index of the SSB is an odd number or an even number. For example, when the index of the temporary SSB is an odd number, i_SSB=0 in sequence initialization of the reference signal; or when the index of the temporary SSB is an even number, i_SSB=1.

In another possible implementation, to enable the terminal device to distinguish ambiguity of four consecutive SSBs, the temporary SSB carries 2 bits of information, indicating a remainder of an index mod 4, where the index is carried in the temporary SSB.

Figure 8:
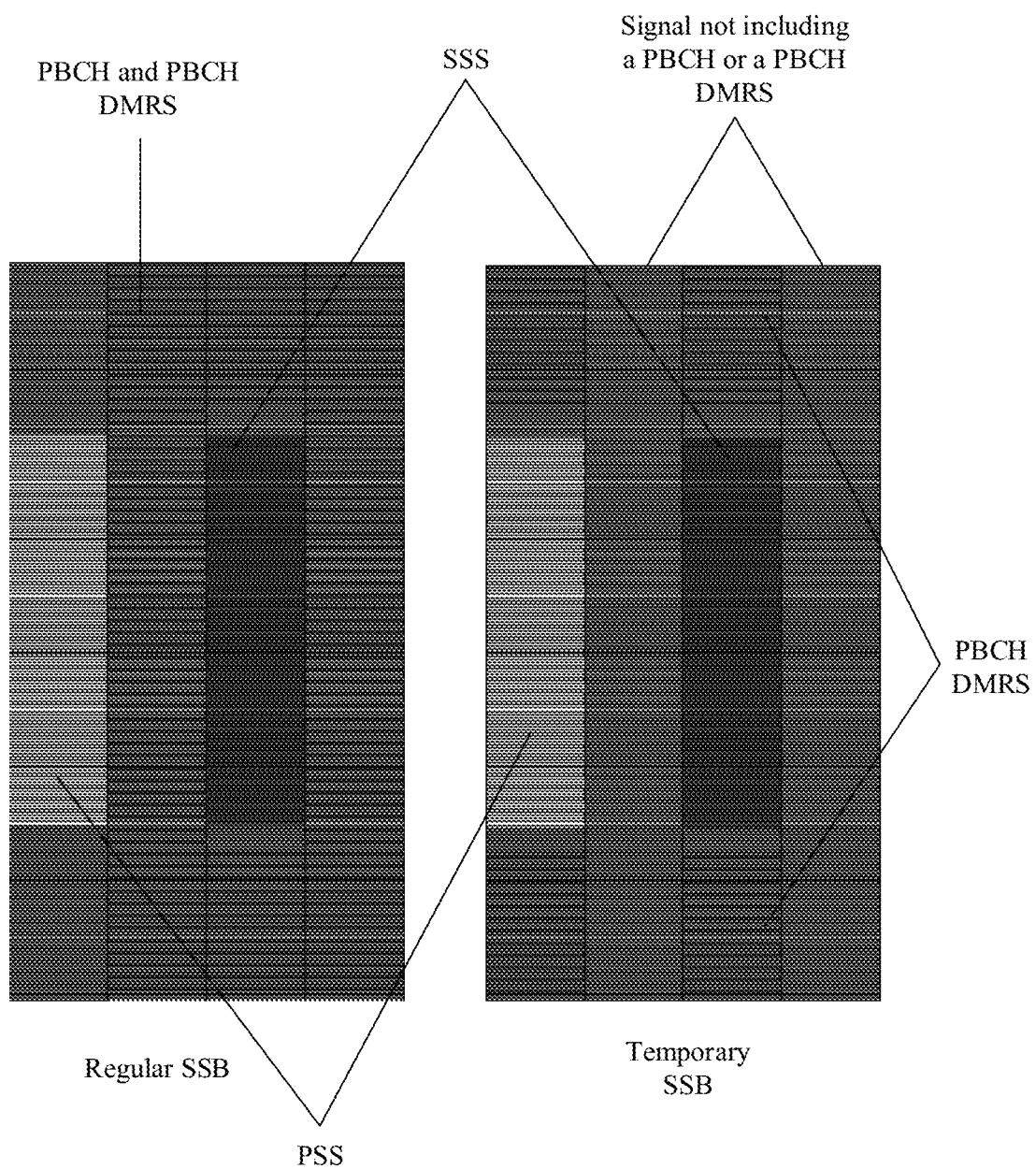
FIG. 8 is a schematic diagram of another type of composition of a regular SSB and a temporary SSB according to an embodiment of this application.

Optionally, the index information is carried in the temporary SSB through scrambling by using a sequence of an OCC and/or a DMRS. For example, PSS and SSS sequences of the temporary SSB are multiplied by an OCC whose length is 2, to represent 1 bit of information (a most significant bit). For example, when the most significant bit is 1, the OCC is [1 1]; and when the most significant bit is 0, the OCC is [1 −1]. In a symbol (OFDM symbol) of a PSS and an SSS, an extra reference signal, for example, a PBCH DMRS, is sent on a subcarrier different from that occupied by the PSS and the SSS. Another 1 bit of information (a least significant bit) is represented in scrambling initialization of the sequence. For example, when the least significant bit is 0, i_SSB=0 in sequence initialization of the reference signal; or when the least significant bit is 1, i_SSB=1. Combinations 00, 01, 10, and 11 of the most significant bit and the least significant bit may respectively represent remainders 0, 1, 2, and 3 of the index mod 4. When an extra reference signal is sent in the symbol (OFDM symbol) of the PSS and the SSS, a comparison between a regular SSB and a temporary SSB is shown in FIG. 8. The picture on the left is a regular SSB, and the picture on the right is a temporary SSB. The temporary SSB includes an SSB, an SSS, and index information.

In a CA scenario, the terminal device may obtain frame boundary timing from the primary serving cell; and determine, based on the offset of a temporary SSB, whether a temporary SSB or a regular SSB is detected. If a temporary SSB is detected, an index of the temporary SSB may be determined based on a time-domain location and index information of the detected temporary SSB and a frame boundary location, thereby obtaining timing of the secondary serving cell. When a large receiving timing error may exist between the primary serving cell and the secondary serving cell, the index of the temporary SSB may further be determined based on index information of the temporary SSB carried by using an OCC or a DMRS.

In a possible implementation, the temporary SSB does not include index information, and may be applied to scenarios in which an SSB subcarrier spacing in a secondary serving cell is 15 kHz or 30 kHz, or an SSB subcarrier spacing in a secondary serving cell is 120 kHz or 240 kHz and a primary serving cell is located in FR2. The temporary SSB includes index information, and may be applied to scenarios in which an SSB subcarrier spacing in a secondary serving cell is 120 kHz or 240 kHz and a primary serving cell is located in FR1.

To further reduce signaling overheads and save resources of the network device, after completing the secondary serving cell detection, the terminal device sends, to the network device, a message indicating that the secondary serving cell detection is completed. After receiving the message that is sent by the terminal device and that indicates that the secondary serving cell detection is completed or after sending temporary SSB bursts in the secondary serving cell for duration exceeding a duration threshold, the network device stops sending a temporary SSB burst in the secondary serving cell, thereby reducing signaling overheads and saving resources of the network device.

In a possible implementation, a cell detection duration threshold in a process of activating the secondary serving cell by the terminal device is determined based on the union set of the regular SSB burst and the temporary SSB burst. Optionally, a manner in which the terminal device determines the cell detection duration threshold based on the union set of the regular SSB burst and the temporary SSB burst is the same as a manner in which the network device determines the duration threshold for sending temporary SSB bursts in the secondary serving cell, and both manners are implemented based on the union set of the regular SSB burst and the temporary SSB burst. In other words, the duration threshold for sending temporary SSB bursts by the network device in the secondary serving cell by the network device is equal to the cell detection duration threshold in the process of activating the secondary serving cell by the terminal device.

Embodiment 2

The foregoing describes, mainly from the perspective of interaction between the network device and the terminal device, the solutions provided in this application. It may be understood that to implement the foregoing functions, each network element includes a corresponding hardware structure and/or software module (or unit) for implementing each function. A person skilled in the art should easily be aware that units and algorithm steps in the examples described with reference to the embodiments disclosed in this specification can be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

Figure 9:
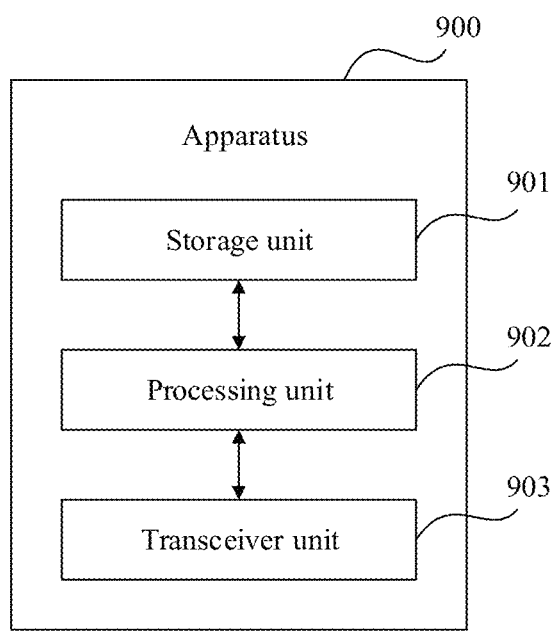
FIG. 9 is a schematic block diagram of a network device according to an embodiment of this application.

When an integrated unit (module) is used, FIG. 9 is a possible example block diagram of still another communication apparatus according to an embodiment of this application. The communication apparatus 900 may exist in a form of software. The apparatus 900 may include a processing unit 902 and a transceiver unit 903.

In a possible design, the processing unit 902 is configured to implement a corresponding processing function. The transceiver unit 903 is configured to support the apparatus 900 in communicating with another network entity. Optionally, the transceiver unit 903 may include a receiving unit and/or a sending unit, which are respectively configured to perform a receiving operation and a sending operation. Optionally, the apparatus 900 may further include a storage unit 901, configured to store program code and/or data of the apparatus 900.

The apparatus 900 may be the network device in any one of the foregoing embodiments (where for example, the network device is the network device in Embodiment 1), or may be a component, such as a chip, disposed in the network device. The processing unit 902 may support the apparatus 900 in performing actions of the network device in the foregoing method examples. Alternatively, the processing unit 902 mainly performs internal actions of the network device in the method examples, and the transceiver unit 903 may support communication between the apparatus 900 and a terminal device.

Specifically, in an embodiment, the processing unit 902 is configured to generate temporary SSB burst configuration information, where the temporary SSB burst configuration information includes a periodicity and/or an offset for sending a temporary SSB burst in a secondary serving cell configured for the terminal device; and the transceiver unit 903 is configured to send the temporary SSB burst configuration information to the terminal device served by the secondary serving cell, and send a temporary SSB burst in the secondary serving cell based on the temporary SSB burst configuration information, where a temporary SSB included in the temporary SSB burst does not include a PBCH.

In a possible design, the temporary SSB carries index information of the temporary SSB.

In a possible design, that the temporary SSB carries index information of the temporary SSB includes:
  the temporary SSB carries 1 bit of information, indicating a remainder of an index mod 2, where the index is carried in the temporary SSB; or
  the temporary SSB carries 2 bits of information, indicating a remainder of an index mod 4, where the index is carried in the temporary SSB.

In a possible design, the index information is carried in the temporary SSB through scrambling by using a sequence of an OCC and/or a sequence of a DMRS.

In a possible design, the temporary SSB burst and a regular SSB burst that is sent by the transceiver unit 903 in the secondary serving cell are sent in different half-frames.

In a possible design, a quantity of temporary SSBs included in a first half-frame for sending the temporary SSB burst is equal to a quantity of regular SSBs included in a second half-frame for sending the regular SSB burst, and a mapped time-domain symbol location of the temporary SSB burst in the first half-frame is the same as a mapped time-domain symbol location of the regular SSB burst in the second half-frame.

In a possible design, the processing unit 902 is further configured to: before the transceiver unit 903 sends the temporary SSB burst configuration information to the terminal device served by the secondary serving cell, determine, based on capability information that is sent by the terminal device and that is received by the transceiver unit 903, that the terminal device supports secondary serving cell detection based on a temporary SSB burst, where the capability information indicates whether the terminal device supports secondary serving cell detection based on a temporary SSB burst.

In a possible design, the transceiver unit 903 is further configured to: after receiving a message that is sent by the terminal device and that indicates that the secondary serving cell detection is completed, stop sending a temporary SSB burst in the secondary serving cell; or stop sending a temporary SSB burst in the secondary serving cell when duration of sending temporary SSB bursts in the secondary serving cell exceeds a duration threshold.

Figure 10:
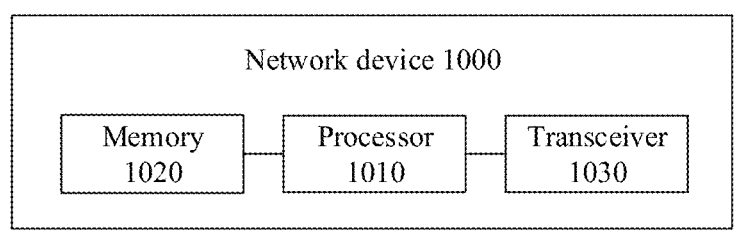
FIG. 10 is a schematic block diagram of another network device according to an embodiment of this application.

As shown in FIG. 10, an embodiment of this application further provides a network device 1000. The network device 1000 includes a processor 1010, a memory 1020, and a transceiver 1030.

In a possible design, the memory 1020 stores instructions, a program, or data, and the memory 1020 may be configured to implement a function of the storage unit 901 in the foregoing embodiment. The processor 1010 is configured to read the instructions, the program, or the data stored in the memory 1020. When the instructions or the program stored in the memory 1020 is executed, the processor 1010 is configured to perform an operation performed by the processing unit 902 in the foregoing embodiment, and the transceiver 1030 is configured to perform an operation performed by the transceiver unit 903 in the foregoing embodiment.

It should be understood that the communication apparatus 900 or the network device 1000 in the embodiments of this application may correspond to the network device in the communication method (in FIG. 2) in the embodiments of this application, and operations and/or functions of the modules in the communication apparatus 900 or the network device 1000 are intended to implement corresponding processes in the method in FIG. 2. For brevity, details are not described herein again.

Figure 11:
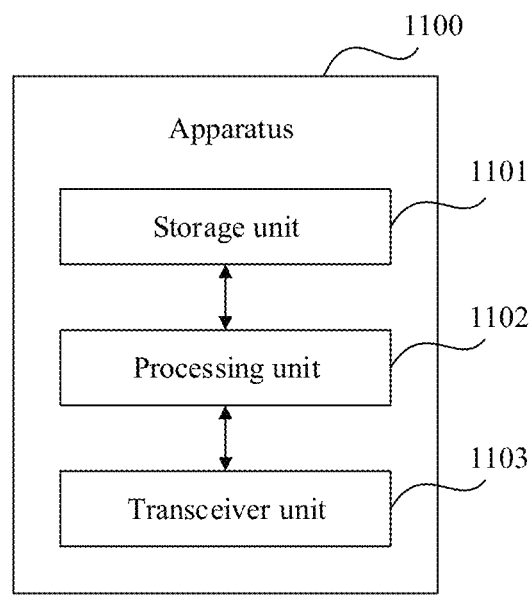
FIG. 11 is a schematic block diagram of a terminal device according to an embodiment of this application.

When an integrated unit (module) is used, FIG. 11 is a possible example block diagram of a communication apparatus according to an embodiment of this application. The apparatus 1100 may exist in a form of software. The apparatus 1100 may include a processing unit 1102 and a transceiver unit 1103.

In a possible design, the processing unit 1102 is configured to implement a corresponding processing function. The transceiver unit 1103 is configured to support the apparatus 1100 in communicating with another network entity. Optionally, the transceiver unit 1103 may include a receiving unit and/or a sending unit, which are respectively configured to perform a receiving operation and a sending operation. Optionally, the apparatus 1100 may further include a storage unit 1101, configured to store program code and/or data of the apparatus 1100.

The apparatus 1100 may be the terminal device in any one of the foregoing embodiments, or may be a component, such as a chip, disposed in the terminal device. The processing unit 1102 may support the apparatus 1100 in performing actions of the terminal device in the foregoing method examples. Alternatively, the processing unit 1102 mainly performs internal actions of the terminal device in the method examples, and the transceiver unit 1103 may support communication between the apparatus 1100 and a network device.

Specifically, in a possible embodiment, the transceiver unit 1103 is configured to receive temporary SSB burst configuration information sent by the network device, where the temporary SSB burst configuration information includes a periodicity and/or an offset for sending a temporary SSB burst by the network device in a secondary serving cell configured for the communication apparatus; and the processing unit 1102 is configured to activate the secondary serving cell based on the temporary SSB burst configuration information and based on a regular SSB burst and a temporary SSB burst sent by the network device in the secondary serving cell, where a temporary SSB included in the temporary SSB burst does not include a PBCH.

In a possible design, a cell detection duration threshold in a process of activating the secondary serving cell by the processing unit 1102 is determined based on a union set of the regular SSB burst and the temporary SSB burst.

In a possible design, the temporary SSB carries index information of the temporary SSB.

In a possible design, that the temporary SSB carries index information of the temporary SSB includes:
the temporary SSB carries 1 bit of information, indicating a remainder of an index mod 2, where the index is carried in the temporary SSB; or
the temporary SSB carries 2 bits of information, indicating a remainder of an index mod 4, where the index is carried in the temporary SSB.

In a possible design, the index information is carried in the temporary SSB through scrambling by using a sequence of an OCC and/or a sequence of a DMRS.

In a possible design, the temporary SSB burst and the regular SSB burst that is sent by the network device in the secondary serving cell are sent in different half-frames.

In a possible design, a quantity of temporary SSBs included in a first half-frame for sending the temporary SSB burst is equal to a quantity of regular SSBs included in a second half-frame for sending the regular SSB burst, and a mapped time-domain symbol location of the temporary SSB burst in the first half-frame is the same as a mapped time-domain symbol location of the regular SSB burst in the second half-frame.

In a possible design, the transceiver unit 1103 is further configured to: before receiving the temporary SSB burst configuration information sent by the network device, send capability information to the network device, where the capability information indicates whether the communication apparatus supports secondary serving cell detection based on a temporary SSB burst.

In a possible design, the transceiver unit 1103 is further configured to: after the secondary serving cell detection is completed, send, to the network device, a message indicating that the secondary serving cell detection is completed.

Figure 12:
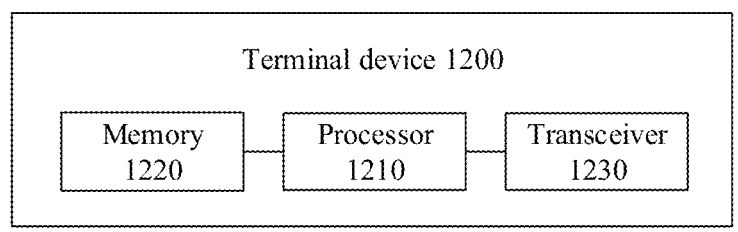
FIG. 12 is a schematic block diagram of another terminal device according to an embodiment of this application.

As shown in FIG. 12, an embodiment of this application further provides a terminal device 1200. The terminal device 1200 includes a processor 1210, a memory 1220, and a transceiver 1230.

In a possible design, the memory 1220 stores instructions, a program, or data, and the memory 1220 may be configured to implement a function of the storage unit 1101 in the foregoing embodiment. The processor 1210 is configured to read the instructions, the program, or the data stored in the memory 1220. When the instructions or the program stored in the memory 1220 is executed, the processor 1210 is configured to perform an operation performed by the processing unit 1102 in the foregoing embodiment, and the transceiver 1230 is configured to perform an operation performed by the transceiver unit 1103 in the foregoing embodiment.

It should be understood that the communication apparatus 1100 or the terminal device 1200 in the embodiments of this application may correspond to the terminal device in the communication method (in FIG. 2) in the embodiments of this application, and operations and/or functions of the modules in the communication apparatus 1100 or the terminal device 1200 are intended to implement corresponding processes in the method in FIG. 2. For brevity, details are not described herein again.

An embodiment of this application further provides a communication apparatus. The communication apparatus may be a terminal device or a circuit. The communication apparatus may be configured to perform an action performed by the terminal device in the foregoing method embodiments.

Figure 13:
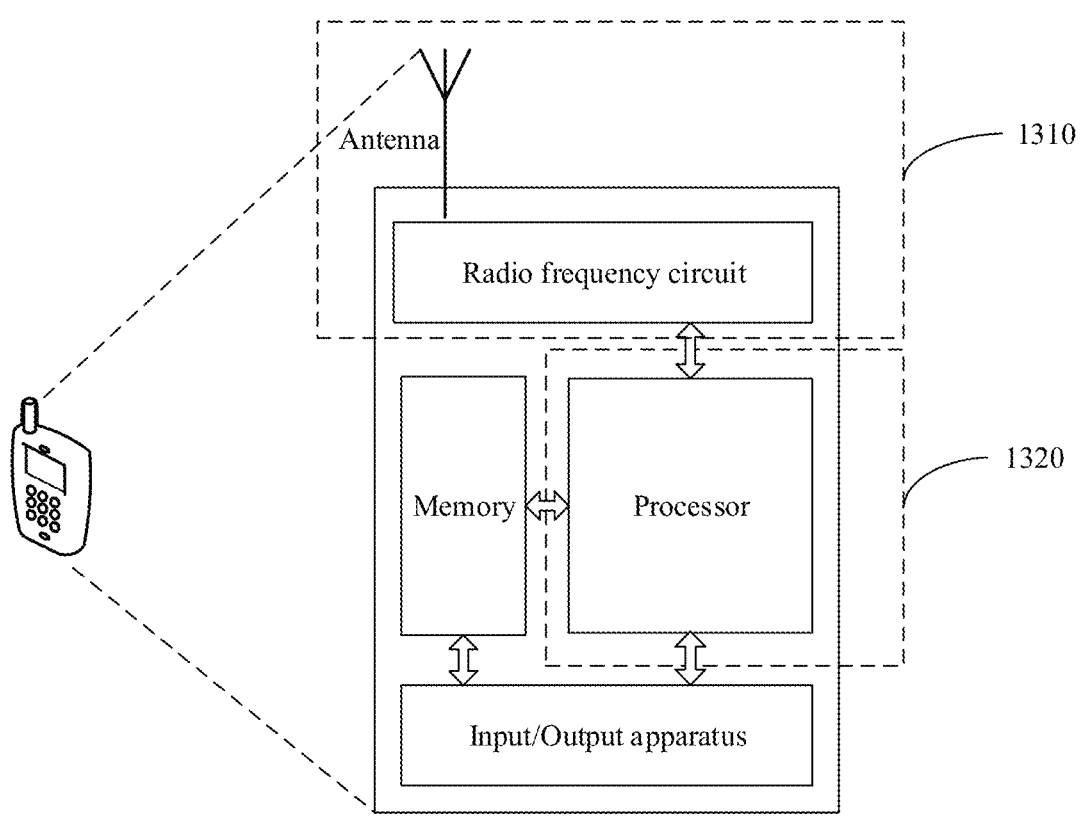
FIG. 13 is a schematic diagram of a structure of a terminal device according to an embodiment of this application.

When the communication apparatus is a terminal device, FIG. 13 is a simplified schematic diagram of a structure of the terminal device. For ease of understanding and illustration, an example in which the terminal device is a mobile phone is used in FIG. 13. As shown in FIG. 13, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display screen, or a keyboard, is mainly configured to: receive data input by a user, and output data to the user. It should be noted that some types of terminal devices may have no input/output apparatus.

When the processor needs to send data, after the processor performs baseband processing on the to-be-sent data, the processor outputs a baseband signal to the radio frequency circuit, and the radio frequency circuit performs radio frequency processing on the baseband signal and then sends the radio frequency signal to the outside in a form of an electromagnetic wave through the antenna. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data. For ease of description, only one memory and one processor are shown in FIG. 13. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit (or a communication unit) of the terminal device, and the processor having a processing function may be considered as a processing unit of the terminal device. As shown in FIG. 13, the terminal device includes a transceiver unit 1310 and a processing unit 1320. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 1310 and that is configured to implement a receiving function may be considered as a receiving unit, and a component that is in the transceiver unit 1310 and that is configured to implement a sending function may be considered as a sending unit. In other words, the transceiver unit 1310 includes the receiving unit and the sending unit. The transceiver unit sometimes may also be referred to as a transceiver, a transceiver, a transceiver circuit, or the like. The receiving unit sometimes may also be referred to as a receiver, a receiver, a receiver circuit, or the like. The sending unit sometimes may also be referred to as a transmitter, a transmitter, a transmit circuit, or the like.

It should be understood that the transceiver unit 1310 is configured to perform a sending operation and a receiving operation on a terminal device side in the foregoing method embodiment, and the processing unit 1320 is configured to perform an operation other than the receiving operation and the sending operation of the terminal device in the foregoing method embodiment.

For example, in an implementation, the transceiver unit 1310 is configured to perform sending and receiving operations on the terminal device side in S201 in FIG. 2; and/or the transceiver unit 1310 is further configured to perform other sending and receiving steps on the terminal device side in the embodiments of this application. The processing unit 1320 is configured to perform the processing operation on the terminal device side in S203 in FIG. 2; and/or the processing unit 1320 is further configured to perform other processing operations on the terminal device side in the embodiments of this application.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

In another form of this embodiment, a computer-readable storage medium is provided. The computer-readable storage medium stores instructions. When the instructions are executed, the methods on the terminal device side in the foregoing method embodiments may be performed.

In another form of this embodiment, a computer program product that includes instructions is provided. When the instructions are executed, the methods on the terminal device side in the foregoing method embodiments may be performed.

In another form of this embodiment, a chip is provided. The chip is coupled to a memory, and is configured to read and execute instructions stored in the memory. When the instructions are executed, the methods on the terminal device side in the foregoing method embodiments may be performed.

Figure 14:
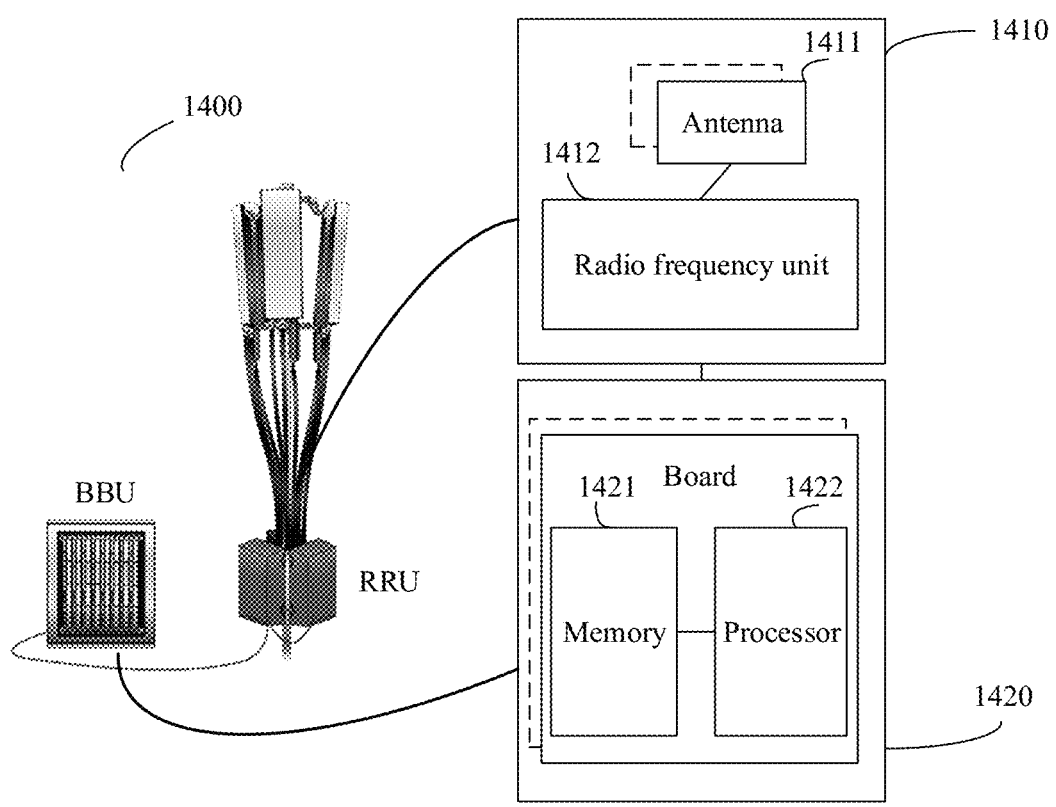
FIG. 14 is a schematic diagram of a structure of a network device according to an embodiment of this application.

When the apparatus in this embodiment is a network device, the network device may be shown in FIG. 14. An apparatus 1400 includes one or more radio frequency units, such as a remote radio unit (remote radio unit, RRU) 1410 and one or more baseband units (baseband unit, BBU) (which may also be referred to as a digital unit, digital unit, DU) 1420. The RRU 1410 may be referred to as a transceiver unit, and corresponds to the transceiver unit 903 in FIG. 9. Optionally, the transceiver unit may also be referred to as a transceiver, a transceiver circuit, a transceiver, or the like, and may include at least one antenna 1411 and a radio frequency unit 1412. The RRU 1410 is mainly configured to: receive and send a radio frequency signal, and perform conversion between the radio frequency signal and a baseband signal. For example, the RRU 1410 is configured to send configuration information to a terminal device. The BBU 1420 is mainly configured to perform baseband processing, control a base station, and so on. The RRU 1410 and the BBU 1420 may be physically disposed together, or may be physically disposed separately, to be specific, may be on a distributed base station.

The BBU 1420 is a control center of the base station, and may also be referred to as a processing module. The BBU 1420 may correspond to the processing unit 902 in FIG. 9, and is mainly configured to implement a baseband processing function such as channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 1420 may include one or more boards, and a plurality of boards may jointly support a radio access network (such as an LTE network) of a single access standard, or may separately support radio access networks (such as an LTE network, a 5G network, or another network) of different access standards. The BBU 1420 further includes a memory 1421 and a processor 1422. The memory 1421 is configured to store necessary instructions and data. The processor 1422 is configured to control the base station to perform a necessary action, for example, configured to control the base station to perform an operation procedure related to the network device in the foregoing method embodiment. The memory 1421 and the processor 1422 may serve the one or more boards. In other words, a memory and a processor may be independently disposed on each board, or a plurality of boards may share a same memory and a same processor. In addition, a necessary circuit may further be disposed on each board.

In another form of this embodiment, a computer-readable storage medium is provided. The computer-readable storage medium stores instructions. When the instructions are executed, the methods on a network device side in the foregoing method embodiments may be performed.

In another form of this embodiment, a computer program product that includes instructions is provided. When the instructions are executed, the methods on the network device side in the foregoing method embodiments may be performed.

In another form of this embodiment, a chip is provided. The chip is coupled to a memory, and is configured to read and execute instructions stored in the memory. When the instructions are executed, the methods on the network device side in the foregoing method embodiments may be performed.

In an implementation process, the steps of the method in the embodiments may be completed by using a hardware integrated logical circuit in the processor, or by using instructions in a form of software. The steps of the methods disclosed with reference to the embodiments of this application may be directly performed and completed by a hardware processor, or may be performed and completed by using a combination of hardware and software modules in the processor.

It should be noted that the processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose central processing unit (central processing unit, CPU), a general-purpose processor, digital signal processing (digital signal processing, DSP), an application specific integrated circuit (application specific integrated circuits, ASIC), a field programmable gate array (field programmable gate array, FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor, or the like.

It may be understood that the memory or storage unit in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external buffer. By way of example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that, the memory in the system and the method described in this specification includes but is not limited to these memories and any memory of another proper type.

All or some of the foregoing embodiments may be implemented by software, hardware, firmware, or any combination thereof. When software is used for implementation, all or some of the embodiments may be implemented in a form of a computer program product. The computer program product includes one or more computer programs or instructions. When the computer programs or the instructions are loaded and executed on the computer, the procedure or functions according to the embodiments of this application are completely or partially generated. The computer may be a general-purpose computer, a dedicated computer, a computer network, or another programmable apparatus. The computer programs or the instructions may be stored in a computer-readable storage medium, or may be transmitted by using the computer-readable storage medium. The computer-readable storage medium may be any usable medium accessible by a computer, or a data storage device, such as a server, integrating one or more usable media. The usable medium may be a magnetic medium, for example, a floppy disk, a hard disk, or a magnetic tape; may be an optical medium, for example, a DVD; or may be a semiconductor medium, for example, a solid-state drive (solid state disk, SSD).

The various illustrative logical units and circuits described in the embodiments of this application may implement or operate the described functions through a general-purpose processor, a digital signal processor, an application specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor can read information from the storage medium and write information to the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although the embodiments of this application are described with reference to specific features, it is clear that various modifications and combinations may be made to them without departing from the spirit and scope of the embodiments of this application. Correspondingly, the specification and accompanying drawings are merely example descriptions of the embodiments of this application that are defined by the appended claims, and are considered to cover any or all of modifications, variations, combinations, or equivalents in the scope of the embodiments of this application.

What is claimed is:

1. A communication method, comprising:
   sending, by a network device, temporary synchronization signal block burst (SSB) burst configuration information to a terminal device served by a secondary serving cell, wherein the temporary SSB burst configuration information comprises a periodicity or an offset for sending a temporary SSB burst by the network device in the secondary serving cell configured for the terminal device; and
   sending, by the network device, the temporary SSB burst in the secondary serving cell based on the temporary SSB burst configuration information, wherein a temporary SSB comprised in the temporary SSB burst does not comprise a physical broadcast channel (PBCH).

2. The method according to claim 1, wherein the temporary SSB carries index information of the temporary SSB; wherein the temporary SSB carries index information of the temporary SSB comprises:
   the temporary SSB carries 1 bit of information, indicating a remainder of an index mod 2, wherein the index is carried in the temporary SSB; or
   the temporary SSB carries 2 bits of information, indicating a remainder of an index mod 4, wherein the index is carried in the temporary SSB.

3. The method according to claim 2, wherein the index information is carried in the temporary SSB through scrambling by using a sequence of an orthogonal cover code (OCC) or a sequence of a demodulation reference signal (DMRS).

4. The method according to claim 1, wherein the temporary SSB burst and a regular SSB burst that is sent by the network device in the secondary serving cell are sent in different half-frames.

5. The method according to claim 1, wherein the method further comprises:
   stopping, by the network device, sending a temporary SSB burst in the secondary serving cell after receiving a message that is sent by the terminal device and that indicates that a secondary serving cell detection is completed; or
   stopping, by the network device, sending a temporary SSB burst in the secondary serving cell when duration of sending temporary SSB bursts in the secondary serving cell exceeds a duration threshold.

6. A communication method, comprising:
   receiving, by a terminal device, temporary synchronization signal block burst (SSB) burst configuration information sent by a network device, wherein the temporary SSB burst configuration information comprises a periodicity or an offset for sending a temporary SSB burst by the network device in a secondary serving cell configured for the terminal device; and
   activating, by the terminal device, the secondary serving cell based on the temporary SSB burst configuration information and based on a regular SSB burst and the temporary SSB burst sent by the network device in the secondary serving cell, wherein a temporary SSB comprised in the temporary SSB burst does not comprise a physical broadcast channel (PBCH).

7. The method according to claim 6, wherein the temporary SSB carries index information of the temporary SSB; wherein the temporary SSB carries index information of the temporary SSB comprises:
the temporary SSB carries 1 bit of information, indicating a remainder of an index mod 2, wherein the index is carried in the temporary SSB; or
the temporary SSB carries 2 bits of information, indicating a remainder of an index mod 4, wherein the index is carried in the temporary SSB.

8. The method according to claim 7, wherein the index information is carried in the temporary SSB through scrambling by using a sequence of an orthogonal cover code (OCC) or a sequence of a demodulation reference signal (DMRS).

9. The method according to claim 6, wherein the temporary SSB burst and the regular SSB burst that is sent by the network device in the secondary serving cell are sent in different half-frames.

10. The method according to claim 6, wherein the method further comprises:
sending, by the terminal device to the network device after completing a secondary serving cell detection, a message indicating that the secondary serving cell detection is completed.

11. A communication apparatus, comprising:
at least one processor; and
a memory storing programming instructions for execution by the at least one processor, the programming instructions instructing the communication apparatus to perform operations comprising:
generating temporary synchronization signal block burst (SSB) burst configuration information, wherein the temporary SSB burst configuration information comprises a periodicity or an offset for sending a temporary SSB burst in a secondary serving cell configured for a terminal device; and
sending the temporary SSB burst configuration information to the terminal device served by the secondary serving cell, and sending the temporary SSB burst in the secondary serving cell based on the temporary SSB burst configuration information, wherein a temporary SSB comprised in the temporary SSB burst does not comprise a physical broadcast channel (PBCH).

12. The communication apparatus according to claim 11, wherein the temporary SSB carries index information of the temporary SSB;
wherein the temporary SSB carries index information of the temporary SSB comprises:
the temporary SSB carries 1 bit of information, indicating a remainder of an index mod 2, wherein the index is carried in the temporary SSB; or
the temporary SSB carries 2 bits of information, indicating a remainder of an index mod 4, wherein the index is carried in the temporary SSB.

13. The communication apparatus according to claim 12, wherein the index information is carried in the temporary SSB through scrambling by using a sequence of an orthogonal cover code (OCC) or a sequence of a demodulation reference signal (DMRS).

14. The communication apparatus according to claim 13, wherein the temporary SSB burst and a regular SSB burst that is sent by the communication apparatus in the secondary serving cell are sent in different half-frames.

15. The communication apparatus according to claim 11, wherein the operations further comprises:
stopping sending a temporary SSB burst in the secondary serving cell after receiving a message that is sent by the terminal device and that indicates that a secondary serving cell detection is completed; or
stopping sending a temporary SSB burst in the secondary serving cell when duration of sending temporary SSB bursts in the secondary serving cell exceeds a duration threshold.

16. A communication apparatus, comprising:
at least one processor; and
a memory storing programming instructions for execution by the at least one processor, the programming instructions instructing the communication apparatus to perform operations comprising:
receiving temporary synchronization signal block burst (SSB) burst configuration information sent by a network device, wherein the temporary SSB burst configuration information comprises a periodicity or an offset for sending a temporary SSB burst by the network device in a secondary serving cell configured for the communication apparatus; and
activating the secondary serving cell based on the temporary SSB burst configuration information and based on a regular SSB burst and the temporary SSB burst sent by the network device in the secondary serving cell, wherein a temporary SSB comprised in the temporary SSB burst does not comprise a physical broadcast channel (PBCH).

17. The communication apparatus according to claim 16, wherein the temporary SSB carries index information of the temporary SSB;
wherein the temporary SSB carries index information of the temporary SSB comprises:
the temporary SSB carries 1 bit of information, indicating a remainder of an index mod 2, wherein the index is carried in the temporary SSB; or
the temporary SSB carries 2 bits of information, indicating a remainder of an index mod 4, wherein the index is carried in the temporary SSB.

18. The communication apparatus according to claim 17, wherein the index information is carried in the temporary SSB through scrambling by using a sequence of an orthogonal cover code (OCC) or a sequence of a demodulation reference signal (DMRS).

19. The communication apparatus according to claim 16, wherein the temporary SSB burst and the regular SSB burst that is sent by the network device in the secondary serving cell are sent in different half-frames.

20. The communication apparatus according to claim 16, wherein the operations further comprises:
sending to the network device after completing a secondary serving cell detection, a message indicating that the secondary serving cell detection is completed.

* * * * *